United States Patent
Hashemzadeh et al.

(10) Patent No.: US 9,221,717 B2
(45) Date of Patent: Dec. 29, 2015

(54) SILANE-MODIFIED ADDITIVES AND SILANE-MODIFIED POLYMER COMPOUNDS

(75) Inventors: Abdulmajid Hashemzadeh, Burgkirchen (DE); Marion Killat, Burghausen (DE)

(73) Assignee: Wacker Chemie AG, Munich (DE)

( * ) Notice: Subject to any disclaimer, the term of this patent is extended or adjusted under 35 U.S.C. 154(b) by 946 days.

(21) Appl. No.: 12/673,350

(22) PCT Filed: Aug. 11, 2008

(86) PCT No.: PCT/EP2008/060501
§ 371 (c)(1),
(2), (4) Date: Feb. 12, 2010

(87) PCT Pub. No.: WO2009/021929
PCT Pub. Date: Feb. 19, 2009

(65) Prior Publication Data
US 2011/0201727 A1    Aug. 18, 2011

(30) Foreign Application Priority Data
Aug. 14, 2007   (DE) .......................... 10 2007 038 333

(51) Int. Cl.
| | |
|---|---|
| C08L 83/00 | (2006.01) |
| C08L 83/08 | (2006.01) |
| C04B 24/42 | (2006.01) |
| C04B 40/00 | (2006.01) |
| C08L 23/08 | (2006.01) |
| C08L 29/04 | (2006.01) |
| C04B 103/65 | (2006.01) |
| C08L 43/04 | (2006.01) |

(52) U.S. Cl.
CPC ............. *C04B 24/42* (2013.01); *C04B 40/0039* (2013.01); *C08L 23/0853* (2013.01); *C08L 29/04* (2013.01); *C08L 83/08* (2013.01); *C04B 2103/65* (2013.01); *C08L 43/04* (2013.01)

(58) Field of Classification Search
CPC ..... C08B 24/42; C08L 40/0039; C08L 29/04; C08L 23/0853; C08L 83/08; C08L 43/04; C08L 83/06; C04B 2103/65; C04B 24/42; C04B 40/0039
USPC ........................................ 524/3, 588; 525/61
See application file for complete search history.

(56) References Cited

U.S. PATENT DOCUMENTS

| | | | | |
|---|---|---|---|---|
| 4,990,563 | A * | 2/1991 | Sau ................... | 525/61 |
| 5,753,733 | A | 5/1998 | Eck et al. | |
| 6,180,177 | B1 * | 1/2001 | Nagashima et al. ....... | 427/388.4 |
| 6,191,235 | B1 | 2/2001 | Eck et al. | |
| 6,429,239 | B1 | 8/2002 | Eck et al. | |
| 2001/0034391 | A1 | 10/2001 | Eck et al. | |
| 2002/0040096 | A1 | 4/2002 | Sandor et al. | |
| 2006/0293440 | A1 | 12/2006 | Tseitlin et al. | |
| 2007/0088110 | A1 * | 4/2007 | Kohl et al. .................... | 524/261 |

(Continued)

FOREIGN PATENT DOCUMENTS

| | | |
|---|---|---|
| AU | 2006308023 B3 | 5/2007 |
| CN | 100999612 A | 7/2007 |

(Continued)

OTHER PUBLICATIONS

Witucki, Gerald L., "A Silane Primer: Chemistry and Applications of Alkoxy Silanes," *Journal of Coatings Technology*, 65(822):57-60, Jul. 1993.
Fox, T. G.; #J5—"Influence of Diluent and of Copolymer Composition on the Glass Temperature of a Polymer System"; Bulletin American Physics Society; vol. 1; 1956; p. 123 (1 p).
Lee, W. A. & Rutherford, R. A.; "The Glass Transition Temperatures of Polymers"; Polymer Handbook, $2^{nd}$ Edition; 1975; 53 pp.; J. Wiley & Sons, New York.
Queste, Sébastien; "International Search Report"; Oct. 23, 2008; 2 pp; European Patent Office, Rijswijk, The Netherlands.

*Primary Examiner* — David W Wu
*Assistant Examiner* — Marie Reddick
(74) *Attorney, Agent, or Firm* — RatnerPrestia

(57) ABSTRACT

The invention relates to silane modified additives obtained by condensation of one or a plurality of silanes of the general formula $(RO)_{3-n}R^1{}_nSi(R^2X)(1)$, wherein R is an optionally substituted alkyle, aryle or alkoxyalkyl radical with 1 to 10 carbon atoms or hydrogen, $R^1$ an optionally substituted hydrocarbon radical with 1 to 12 carbon atoms or hydrogen, $R^2$ an optionally substituted alkylene radical with 1 to 20 carbon atoms, wherein methylene units that are not adjacent to one another can be substituted by groups —O—, and X is bound to $R^2$ via a covalent bond and stands for an amino radical $NHR^3$, an epoxy radical $CR^4(O)CR^5R^6$, an urethane radical $NR^3$—C(=O)$OR^3$, an urea radical $NR^3$—C(=O) $NR^3R^4$, a phosphorous acid radical $P(=O)(OH)_2$, an anhydride radical C(=O)O(O=)$CR^3$ or a carbon acid radical, wherein $R^3$ is hydrogen or an optionally substituted alkyle, aryle or amino alkyle radical with 1 to 10 carbon atoms, $R^4$, $R^5$, $R^6$ hydrogen or an optionally substituted alkyle or aryle radical with 1 to 10 carbon atoms, wherein the respective radicals $R^1$, $R^2$, $R^3$, $R^4$, $R^5$ and $R^6$ each obtain their values independently from each other, and n takes on the value 0, 1, 2, or 3, in an aqueous solvent by mixing with one or a plurality of water solvent polymers, wherein the content of water soluble polymers is ≥15 wt. %, based on the dry weight of the silane modified additives, and optionally drying of the thus obtained aqueous mixture.

19 Claims, No Drawings

(56) References Cited

U.S. PATENT DOCUMENTS

| | | |
|---|---|---|
| 2008/0132624 A1 | 6/2008 | Killat et al. |
| 2008/0271848 A1 | 11/2008 | Killat et al. |
| 2011/0201727 A1 | 8/2011 | Hashemzadeh et al. |

FOREIGN PATENT DOCUMENTS

| | | | |
|---|---|---|---|
| DE | 2148456 | 4/1973 | |
| DE | 4402408 | 8/1995 | |
| DE | 4402409 | 8/1995 | |
| DE | 10040407 | 2/2002 | |
| DE | 10 2005 051 588 A1 | 5/2007 | |
| EP | 0035332 | 9/1981 | |
| EP | 0305833 A2 | 3/1989 | |
| EP | 0640630 | 3/1995 | |
| EP | 1134255 | 9/2001 | |
| GB | 1407827 | 9/1975 | |
| JP | 04248816 * | 1/1991 | ............ C08F 8/42 |
| JP | 04248816 * | 9/1992 | |
| WO | WO 2006/058655 | 6/2006 | |
| WO | WO 2006/067366 | 6/2006 | |
| WO | WO 2007/048714 | 5/2007 | |
| WO | 2009021929 A1 | 2/2009 | |

* cited by examiner

SILANE-MODIFIED ADDITIVES AND SILANE-MODIFIED POLYMER COMPOUNDS

CROSS REFERENCE TO RELATED APPLICATIONS

This is a U.S. National Phase filing of PCT application number PCT/EP2008/06051, filed Aug. 11, 2008, which claims priority benefit of German application number DE102007038333.0, filed Aug. 14, 2007, the entire disclosures of which applications are incorporated herein by reference.

FIELD OF THE INVENTION

The invention relates to silane-modified additives, processes for the preparation thereof and the use thereof, and silane-modified polymer compositions, processes for the preparation thereof and the use thereof, for example in coating materials or adhesives, in particular as adhesion promoters in hydraulically setting systems.

BACKGROUND OF THE INVENTION

Organosilicon compounds, such as for example silanes or siloxanes, are frequently used in polymer compositions as water repellants or as adhesion promoters. For the preparation of corresponding polymer compositions in the form of dispersion powders, DE 4402408 A1 proposes polymerizing ethylenically unsaturated organic monomers in the presence of organosilicon compounds dispersible in water and then drying the polymer dispersions thus obtained by means of spray drying. DE 4402409 A1 proposes spraying aqueous polymer dispersions and organosilicon compounds dispersible in water together in order to obtain correspondingly hydrophobized dispersion powders. In DE 10040407 A1, polymer dispersions for tile adhesives are modified with organosilicon compounds and thiourea compounds. For this purpose, ethylenically unsaturated organosilicon compounds and (thio)urea-functional monomers are copolymerized with ethylenically unsaturated organic monomers or low molecular weight compounds having corresponding functions are added to polymer dispersions. EP 640630 A1 discloses using aqueous dispersions of polymers containing vinylsilane units for improving the wet adhesion of adhesive materials. Aqueous dispersions of copolymers containing silane-functional units and the use thereof in tile adhesives are also disclosed in DE-A 2148456 and EP 0035332 A2. EP 2006067366 A1 discloses using organosilicon compounds in dispersion powders for improved adhesion of tile adhesives.

One problem, however, consists in providing compositions containing organosilicon compounds and polymers in storage-stable form. In aqueous polymer compositions, organosilicon compounds tend to separate from the aqueous phase and to undergo an uncontrolled self-condensation so that an increase in the viscosity or even gelling occur. However, even if polymer compositions containing organosilicon compounds are present in solid form, an uncontrolled self-condensation of the organosilicon compounds occurs in the presence of residual moisture or because of atmospheric humidity, so that corresponding polymer compositions can no longer be completely taken up in water. The problems described occur in particular in polymer compositions having high contents of organosilicon compounds.

Furthermore, the organosilicon compounds and the polymers are present in prepared mixtures in the polymer compositions known from the prior art, so that the adaptation of the mixing ratio of the individual components to the respective requirements in the case of different applications cannot be effected in an arbitrary and economical manner.

SUMMARY OF THE INVENTION

Against this background, it was the object to provide silane-modified additives which are storage-stable both in aqueous form and in solid form even at high silane contents and can be mixed in arbitrary ratios with polymers to give storage-stable polymer compositions.

The object was surprisingly achieved by silane-modified additives which were obtained by condensing silanes by mixing with an aqueous solvent in the presence of water-soluble polymers, phase separation or an uncontrolled condensation of the silane being absent owing to the presence of the amount, according to the invention, of water-soluble polymers and as a result of the mixing.

DETAILED DESCRIPTION OF THE INVENTION

The invention relates to silane-modified additives obtainable by condensation of
one or more silanes of the general formula $$(RO)_{3-n}R^1{}_n Si(R^2 X) \qquad (1),$$

in which
R is an optionally substituted alkyl, aryl or alkoxyalkyl radical having 1 to 10 carbon atoms or hydrogen,
$R^1$ is an optionally substituted hydrocarbon radical having 1 to 12 carbon atoms or hydrogen,
$R^2$ is an optionally substituted alkylene radical having 1 to 20 carbon atoms, in which non-neighboring methylene units can be replaced by groups —O—, and
X is bonded via a covalent bond to $R^2$ and is an amino radical $NHR^3$, an epoxy radical $CR^4(O)CR^5R^6$, a urethane radical $NR^3$—C(=O)$OR^3$, a urea radical $NR^3$—C(=O)$NR^3R^4$, a phosphoric acid radical P(=O)(OH)$_2$, an anhydride radical C(=O)O(O=)$CR^3$ or a carboxylic acid radical,
$R^3$ being hydrogen or an optionally substituted alkyl, aryl or aminoalkyl radical having 1 to 10 carbon atoms,
$R^4$, $R^5$, $R^6$ being hydrogen or an optionally substituted alkyl or aryl radical having 1 to 10 carbon atoms,
the respective radicals $R^1$, $R^2$, $R^3$, $R^4$, $R^5$ and $R^6$ assuming their values in each case independently of one another, and n assumes the value 0, 1, 2 or 3,
in an aqueous solvent with mixing with one or more water-soluble polymers,
the content of water-soluble polymers being ≥15% by weight, based on the dry mass of the silane-modified additives, and optionally drying of the aqueous mixture thus obtained.

Preferably, R of the formula (1) is methyl, ethyl or propyl.
Preferably, the radicals $R^1$ of the formula (1) are not substituted. Particularly preferably, $R^1$ is a hydrocarbon radical having 1 to 6 carbon atoms, most preferably methyl, ethyl, propyl, vinyl or phenyl.
Preferably, the radicals $R^2$ of the formula (1) are not substituted. Particularly preferably, $R^2$ is an alkylene radical having 1 to 6 carbon atoms, most preferably methylene, ethylene or propylene.
Preferably, $R^3$ of the formula (1) is hydrogen or a hydrocarbon radical having 1 to 6 carbon atoms, particularly preferably hydrogen, 2-aminoethyl, phenyl, cyclohexyl, methyl, ethyl, propyl or butyl.

$R^4$, $R^5$, $R^6$ of the formula (1) are preferably hydrogen.

All symbols of the formula (1) have their meanings in each case independently of one another. In all embodiments of the formula (1), the silicon atom is in each case tetravalent.

Aminopropyltrialkoxysilanes of the formula (1) and glycidyloxypropylalkoxysilanes of the formula (1) are preferably used.

(3-Aminopropyl)triethoxysilane, (3-aminopropyl)-trimethoxysilane, N-(2-aminoethyl)(3-aminopropyl)-triethoxysilane, N-(2-aminoethyl)(3-aminopropyl)-trimethoxysilane, N-(2-aminoethyl)(3-aminopropyl)-methyldimethoxysilane, 3-(triethoxysilyl)propylsuccinic anhydride, N-cyclohexylaminomethylmethyldiethoxysilane, N-(3-(triethoxysilyl)propyl)methylurethane, N-(3-(trimethoxysilyl)propyl)methylurethane, N-(3-(triethoxysilyl)propyl)urea, N-(3-(trimethoxysilyl)propyl)-urea, (3-glycidyloxypropyl)triethoxysilane and (3-glycidyloxypropyl)trimethoxysilane are also preferred.

The silanes of the formula (1) which are used according to the invention are commercially available products or can be prepared by customary methods in silicon chemistry, for example by processes as described in Noll, Chemie and Technologie der Silikone [Chemistry and Technology of the Silicones], 2nd edition 1968, Weinheim, and in Houben-Weyl, Methoden der organischen Chemie [Methods of Organic Chemistry], Volume E20, Georg Thieme Verlag, Stuttgart (1987).

Suitable water-soluble polymers are polyvinyl alcohols; polyvinyl acetals; polyvinylpyrrolidones; polysaccharides in water-soluble form, such as starches (amylose and amylopectin), celluloses and the carboxymethyl, methyl, hydroxyethyl and hydroxypropyl derivatives thereof, dextrins and cyclodextrins; proteins, such as casein or caseinate, soybean protein, gelatin; lignosulfonates; synthetic polymers, such as poly(meth)acrylic acid, copolymers of (meth)acrylates with carboxy-functional comonomer units, poly(meth)-acrylamide, polyvinylsulfonic acids and the water-soluble copolymers thereof; melamine formaldehyde sulfonates, naphthalene formaldehyde sulfonates, cresol formaldehyde sulfonates, styrene-maleic acid and vinyl ether-maleic acid copolymers.

Partly hydrolyzed or completely hydrolyzed polyvinyl alcohols having a degree of hydrolysis of from 80 to 100 mol %, in particular partly hydrolyzed polyvinyl alcohols having a degree of hydrolysis of from 80 to 95 mol % and a Höppler viscosity, in 4% strength aqueous solution, of from 1 to 30 mPas (Höppler method at 20° C., DIN 53015) are preferred. Partly hydrolyzed polyvinyl alcohols modified so as to impart hydrophobic properties and having a degree of hydrolysis of from 80 to 95 mol % and a Höppler viscosity, in 4% strength aqueous solution, of from 1 to 30 mPas are also preferred. Examples of these are partly hydrolyzed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9 to 11 C atoms, dialkyl maleates and dialkyl fumarates, such as diisopropyl maleate and diisopropyl fumarate, vinyl chloride, vinyl alkyl ethers, such as vinyl butyl ether, olefins, such as ethene or decene. The proportion of the hydrophobic units is preferably from 0.1 to 10% by weight, based on the total weight of the partly hydrolyzed polyvinyl alcohol. It is also possible to use mixtures of said polyvinyl alcohols.

Most preferred are polyvinyl alcohols having a degree of hydrolysis of from 85 to 94 mol % and a Höppler viscosity, in 4% strength aqueous solution, of from 3 to 15 mPas (Höppler method at 20° C., DIN 53015). Said water-soluble polymers are obtainable by means of processes known to the person skilled in the art.

The water-soluble polymers have a solubility of at least 10 g/l in water under standard conditions according to DIN50014.

In the preparation of the silane-modified additives, the proportion of one or more silanes of the formula (1) is preferably from 3 to 40% by weight, particularly preferably from 10 to 35% by weight, very particularly preferably from 15 to 35% by weight, most preferably from 16 to 35% by weight, based in each case on the dry mass of the silane-modified additives. The silane-modified additives contain the water-soluble polymers in an amount of, preferably, ≥25% by weight, particularly preferably from 60 to 97% by weight, very particularly preferably from 70 to 85% by weight and most preferably from 70 to 83% by weight, based in each case on the dry mass of the silane-modified additives.

During the condensation, emulsifiers may additionally be present. If the condensation is carried out in the presence of emulsifiers, the amount thereof is preferably from 1 to 5% by weight, based on the weight of the silanes of the formula (1). Suitable emulsifiers are anionic and cationic as well as nonionic emulsifiers, for example anionic surfactants, such as alkyl sulfates having a chain length of 8 to 18 C atoms, alkyl or alkylaryl ether sulfates having 8 to 18 C atoms in the hydrophobic radical and up to 40 ethylene oxide or propylene oxide units, alkyl- or alkylarylsulfonates having 8 to 18 C atoms, esters and monoesters of sulfosuccinic acid with monohydric alcohols or alkylphenols, or nonionic surfactants, such as alkylpolyglycol ethers or alkylarylpolyglycol ethers having 8 to 40 ethylene oxide units.

The invention furthermore relates to a process for the preparation of silane-modified additives, characterized in that one or more silanes of the general formula

$$(RO)_{3-n}R^1{}_nSi(R^2X) \qquad (1),$$

in which
R is an optionally substituted alkyl, aryl or alkoxyalkyl radical having 1 to 10 carbon atoms or hydrogen,
$R^1$ is an optionally substituted hydrocarbon radical having 1 to 12 carbon atoms or hydrogen,
$R^2$ is an optionally substituted alkylene radical having 1 to 20 carbon atoms, in which non-neighboring methylene units can be replaced by groups —O—, and
X is bonded via a covalent bond to $R^2$ and is an amino radical $NHR^3$, an epoxy radical $CR^4(O)CR^5R^6$, a urethane radical $NR^3$—C($=$O)$OR^3$, a urea radical $NR^3$—C($=$O)$NR^3R^4$, a phosphoric acid radical P($=$O)(OH)$_2$, an anhydride radical C($=$O)O(O$=$)$CR^3$ or a carboxylic acid radical,
$R^3$ being hydrogen or an optionally substituted alkyl, aryl or aminoalkyl radical having 1 to 10 carbon atoms,
$R^4$, $R^5$, $R^6$ being hydrogen or an optionally substituted alkyl or aryl radical having 1 to 10 carbon atoms, the respective radicals $R^1$, $R^2$, $R^3$, $R^4$, $R^5$ and $R^6$ assuming their values in each case independently of one another, and
n assumes the value 0, 1, 2 or 3,
are condensed in an aqueous solvent with mixing with one or more water-soluble polymers,
the content of water-soluble polymers being ≥15% by weight, based on the dry mass of the silane-modified additives, and the aqueous mixture thus obtained is optionally dried.

The aqueous solvent may be water or a solvent mixture comprising water and one or more organic solvents.

Suitable organic solvents are, for example, alcohols, such as methanol or ethanol. The condensation is preferably carried out in water.

Preferably, the water-soluble polymers and the silanes of the formula (1) or the condensates thereof are homogeneously dissolved in the aqueous solvent at the beginning, during and after the condensation.

The silanes (1) or the water-soluble polymers can be used in pure form or in an aqueous solvent. The silanes (1) are preferably used in pure form. The silanes (1) and the water-soluble polymers can be initially introduced completely in an aqueous solvent for the condensation. Alternatively, a part of the silanes (1) or the water-soluble polymers can be initially introduced for the condensation and the remainder of the silanes (1) or of the water-soluble polymers can be added during the condensation. Preferably, the water-soluble polymers are initially introduced in an aqueous solvent and the silanes (1) are added in pure form completely or partly during the condensation.

The temperature during the condensation is preferably from 1 to 100° C., particularly preferably from 20 to 80° C. and most preferably from 40 to 80° C. The reaction time of the condensation is preferably from 4 to 19 hours, particularly preferably from 4 to 7 hours. The pH during the condensation is preferably from 2 to 11 and can be adjusted in a known manner by organic acids as well as inorganic acids, bases or buffers, such as, for example, by addition of hydrochloric acid, ammonia or alkaline earth metal or alkali metal hydroxides, such as, for example, sodium hydroxide solution. The pH can also be adjusted by the silanes (1) if the silanes (1) carry an amino radical, a carboxylic acid radical or a phosphoric acid radical. If silanes (1) in which the radical X is an amino radical $NHR^3$ are used, the pH during the condensation is preferably from 8 to 9. Where the radical X is an epoxy radical $CR^4(O)CR^5R^6$, the pH is preferably from 4 to 7. If silanes (1) in which the radical X is a carboxylic acid or anhydride group are used, the pH is preferably from 3 to 5.

If a plurality of different silanes (1) are fed to a condensation, silanes (1) chosen for this purpose are preferably those which cannot link with one another by covalent bonds via the radicals X; i.e. with the use of silanes (1) in which the radical X is an amino radical $NHR^3$, preferably no further silanes (1) are used in which the radical X is, for example, an epoxy radical $CR^4(O)CR^5R^6$ or anhydride radical $C(=O)O(O=)CR^3$.

The condensation substantially gives rise to self-condensation of silanes with formation of Si—O—Si bonds. Virtually no grafting of the water-soluble polymers with silanes or with condensates of the silanes (1) takes place. As a result of the condensation of the silanes (1), preferably at least 25%, particularly preferably at least 30%, of the hydrolyzable bonds of the silanes of the formula (1) are condensed, based on the total number of hydrolyzable silicon bonds of the silanes (1) used. The hydrolyzable bonds of the silanes (1) are substantially the bonds between the silicon atom and the radicals RO.

The by-products of the condensation reaction can be removed by means of distillation, preferably under reduced pressure, and, if appropriate, by passing through or passing over entraining gases, such as air, nitrogen or steam.

The aqueous mixtures of the silane-modified additives which are obtainable by the process according to the invention are present in the form of aqueous solutions, aqueous emulsions or aqueous dispersions and preferably have a solids content of ≥15% by weight, particularly preferably from 15 to 60% by weight and most preferably from 15 to 50% by weight and are storage-stable in the respective embodiments. Preferably, the silane-modified additives are present as aqueous solution on the form of powders soluble in water.

For the preparation of the silane-modified additives in the form of powders, the aqueous mixtures obtained by the process according to the invention are dried, if appropriate with addition of protective colloids as drying aids. Suitable drying methods are, for example, fluidized-bed drying, freeze drying or spray drying. Suitable drying aids are, for example, the abovementioned water-soluble polymers or cationic synthetic polymers. Polyvinyl alcohols are preferably used as drying aids, the polyvinyl alcohols preferred as water-soluble polymers are also preferably used as drying aids. Preferably, the aqueous mixtures are spray-dried. The spray drying is effected in customary spray drying units, it being possible for the atomization to be effected by means of one-fluid, two-fluid or multifluid nozzles or with a rotating disk. The exit temperature is in general selected in the range from 45° C. to 120° C., preferably from 60° C. to 90° C.

During the drying, a content of up to 1.5% by weight of antifoam, based on the polymeric constituents, has proven advantageous in many cases. For increasing the storability by improving the stability to blocking, in particular in the case of powders having a low glass transition temperature, the powder obtained can be provided with an antiblocking agent (anticaking agent), preferably up to 30% by weight, based on the total weight of polymeric constituents. Examples of antiblocking agents are calcium carbonate or magnesium carbonate, talc, gypsum, silicas, such as, for example, finely divided silicas, kaolins, metakaolin, calcined kaolin, silicates having particle sizes of, preferably, in the range from 10 nm to 100 µm.

The viscosity of the aqueous mixture to be dried is adjusted via the solids content so that a value of <1500 mPas (Brookfield viscosity at 20 revolutions and 23° C.), preferably <500 mPas, is obtained. The solids content of the mixture to be dried is >35%.

For improving the performance characteristics, further additives can be added to the silane-modified additives. Further constituents of the silane-modified additives which are present in preferred embodiments are, for example, pigments, fillers, such as, for example, silicas or zeolites, foam stabilizers, water repellants or air-entraining agents. Preferably, these additives are added to the aqueous silane-modified additives or during or after the drying of the aqueous silane-modified additives.

The invention furthermore relates to silane-modified polymer compositions in the form of aqueous dispersions or powders redispersible in water, characterized in that one or more silane-modified additives and one or more water-insoluble polymers are present.

The water-insoluble polymers have a solubility in water of less than 1 g/l under standard conditions according to DIN50014. The individual constituents of the silane-modified polymer composition may be present in any desired weight ratio.

Suitable water-insoluble polymers are those based on one or more monomers selected from the group consisting of the vinyl esters of straight-chain or branched alkylcarboxylic acids having 1 to 15 C atoms, methacrylates and acrylates of alcohols having 1 to 15 C atoms, vinylaromatics, olefins, dienes or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 13 C atoms, for example VeoVa9R or VeoVa10R (trade names of Hexion). Vinyl acetate is particularly preferred. Methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate are preferred. Methyl acrylate, methyl methacrylate, n-butyl acrylate and 2-ethylhexyl acrylate are particularly preferred. Examples of olefins and dienes are ethylene, propylene and 1,3-butadiene. Suitable vinylaromatics are styrene and vinyltoluene. A suitable vinyl halide is vinyl chloride.

Examples of homo- and copolymers suitable as water-insoluble polymers are vinyl acetate homopolymers, copolymers of vinyl acetate with ethylene, copolymers of vinyl acetate with ethylene and one or more further vinyl esters, copolymers of vinyl acetate with ethylene and acrylates, copolymers of vinyl acetate with ethylene and vinyl chloride, styrene-acrylate copolymers, styrene-1,3-butadiene copolymers.

Vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having 1 to 12 C atoms in the carboxylic acid radical, such as vinyl propionate, vinyl laurate, vinyl esters of alpha-branched carboxylic acids having 9 to 13 C atoms, such as VeoVa9R, VeoVa10R, VeoVa11R; copolymers of vinyl acetate, from 1 to 40% by weight of ethylene and preferably from 1 to 60% by weight of acrylates of straight-chain or branched alcohols having 1 to 15 C atoms, in particular n-butyl acrylate or 2-ethylhexyl acrylate; and copolymers with from 30 to 75% by weight of vinyl acetate, from 1 to 30% by weight of vinyl laurate or vinyl esters of an alpha-branched carboxylic acid having 9 to 11 C atoms, and from 1 to 30% by weight of acrylates of straight-chain or branched alcohols having 1 to 15 C atoms, in particular n-butyl acrylate or 2-ethylhexyl acrylate, which also contain from 1 to 40% by weight of ethylene; copolymers with vinyl acetate, from 1 to 40% by weight of ethylene and from 1 to 60% by weight of vinyl chloride are preferred; it also being possible for the polymers to contain said auxiliary monomers in said amounts, and the data in % by weight summing to 100% by weight in each case.

(Meth)acrylate polymers, such as copolymers of n-butyl acrylate or 2-ethylhexyl acrylate or copolymers of methyl methacrylate with n-butyl acrylate and/or 2-ethylhexyl acrylate and, if appropriate, ethylene; styrene-acrylate copolymers with one or more monomers from the group consisting of methyl acrylate, ethyl acrylate, propyl acrylate, n-butyl acrylate, 2-ethylhexyl acrylate; vinyl acetate-acrylate copolymers with one or more monomers from the group consisting of methyl acrylate, ethyl acrylate, propyl acrylate, n-butyl acrylate, 2-ethylhexyl acrylate and, if appropriate, ethylene; styrene-1,3-butadiene copolymers are also preferred; it also being possible for the polymers to contain said auxiliary monomers in said amounts and for the data in % by weight to sum in each case to 100% by weight.

The choice of monomers or the choice of the proportions by weight of the comonomers is effected so that in general a glass transition temperature Tg of from −50° C. to +50° C., preferably from −30° C. to +40° C., results. The glass transition temperature Tg of the polymers can be determined in a known manner by means of differential scanning calorimetry (DSC). The Tg can also be calculated approximately in advance by means of the Fox equation. According to Fox T. G., Bull. Am. Physics Soc. 1, 3, page 123 (1956), the following is true: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in Kelvin of the homopolymer of the monomer n. Tg values for homopolymers are mentioned in Polymer Handbook 2nd Edition, J. Wiley & Sons, New York (1975).

The water-insoluble polymers are prepared in an aqueous medium and by the emulsions polymerization process or by the suspension polymerization process, preferably by the emulsion polymerization process—as described, for example, in EP-A 2006067366. The water-insoluble polymers are obtained thereby in the form of aqueous dispersions and can be converted by customary drying methods into corresponding powders redispersible in water.

The invention furthermore relates to a process for the preparation of silane-modified polymer compositions, characterized in that one or more silane-modified additives and one or more water-soluble polymers are mixed.

For the preparation of the silane-modified polymer compositions, the water-insoluble polymers or the silane-modified additives can be used independently of one another in the form of powders or in the form of aqueous mixtures. Preferably, aqueous dispersions of the water-insoluble polymers are mixed with aqueous silane-modified additives to give silane-modified polymer compositions in the form of aqueous dispersions and then, if appropriate, dried to give silane-modified polymer compositions in the form of powders redispersible in water. The drying of silane-modified polymer compositions in the form of aqueous dispersions can be effected by customary drying methods, as described above for the drying of aqueous mixtures of the silane-modified additives. Mixing of aqueous dispersions of the water-insoluble polymers with silane-modified additives in the form of powders is also preferred. Mixing of the water-insoluble polymers in the form of powders redispersible in water with the silane-modified additives in the form of powders or aqueous mixtures is also preferred.

For improving the performance characteristics, further additives can be added to the silane-modified polymer compositions. Suitable additives for the silane-modified polymer compositions are, for example, the additives described above for the silane-modified additives. Preferably, these additives are added to the aqueous silane-modified polymer compositions or during or after the drying of the aqueous silane-modified polymer compositions.

The silane-modified additives are suitable, for example, for use as drying aids in the drying of aqueous dispersions of polymers, by means of spray drying, freeze drying or fluidized-bed drying.

The silane-modified additives act in particular as adhesion promoters or as water repellants and can be used in the typical fields of use, such as, for example, in the textile sector, in paper applications or in the construction sector. For example, adhesion problems between hydraulically setting binders and wood, cork, glass fibers or Styropor can be solved with the silane-modified additives.

In the preparation of the silane-modified polymer compositions by the process according to the invention, the mixing ratio of the silane-modified additives and the further constituents of the silane-modified polymer compositions can advantageously be chosen in any desired manner.

The silane-modified additives or the silane-modified polymer compositions are preferably used in construction chemistry products, if appropriate in combination with hydraulically setting binders, such as cements (Portland, high-alumina, trass, slag, magnesia or phosphate cement), gypsum and waterglass, for the production of construction adhesives, in particular tile adhesives, and composite thermal insulation adhesives, renders, filling compounds, such as, for example, floor filling compounds, leveling compounds, slurry-type seal coats, joint mortars and paints. Further applications are pneumatically applied mortar and air-placed concrete for structures of building construction and civil engineering and the lining of tunnel walls.

Particularly preferred fields of use for the silane-modified additives or the silane-modified polymer compositions are tile adhesives for tiles, in particular for tiles with low water absorption, most preferably for tiles with a water absorption of ≤0.2% by weight, in particular of ≤0.05% by weight.

Advantageously, the use of the silane-modified additives or of the silane-modified polymer compositions in tile adhesives leads to an improvement of the adhesion of tiles, in particular of fine stoneware tiles, on the corresponding surfaces.

The following examples serve for the detailed illustration of the invention and should in no way be understood as being limiting.

EXAMPLES

Preparation of an Aqueous Polyvinyl Alcohol Solution

In a double-jacket reactor having a stirrer and reflux condenser, 8 kg of water were heated to 40° C. and 2 kg of polyvinyl alcohol granules (Mowiol 4-88, degree of hydrolysis of 88 mol %, Höppler viscosity of 4 mPas, from Kuraray) were added with stirring. Thereafter, heating to 90° C. and thorough stirring for 2 hours were effected. After cooling to room temperature the solution was filtered. A 20% strength, aqueous polyvinyl alcohol solution was thus obtained.

Preparation of Silane-Modified Additives in the Form of Aqueous Solutions

Example 1

Ex. 1

8.04 kg of the 20% strength, aqueous polyvinyl alcohol solution and 1.25 kg of water were initially introduced into a double-jacket reactor having a stirrer and were heated to 70° C. After stirring for about 30 minutes, 175 g of N-(2-aminoethyl)(3-aminopropyl)trimethoxy-silane were slowly added. After stirring for 5 hours at 70° C., the volatile components were removed from the aqueous solution under reduced pressure and the solution was cooled to room temperature.

Example 2

Ex. 2

The procedure was analogous to example 1, with the difference that 15% by weight of N-(2-aminoethyl)(3-aminopropyl)trimethoxysilane were used, based on the weight of polyvinyl alcohol.

Example 3

Ex. 3

The procedure was analogous to example 1, with the difference that 20% by weight of N-(2-aminoethyl) (3-aminopropyl)trimethoxysilane were used, based on the weight of polyvinyl alcohol.

Example 4

Ex. 4

The procedure was analogous to example 3, with the difference that 30% by weight of N-(2-aminoethyl)(3-aminopropyl)trimethoxysilane were used, based on the weight of polyvinyl alcohol.

Comparative Example 1

COB 1

The procedure was analogous to example 3, with the difference that the polyvinyl alcohol solution and N-(2-aminoethyl)(3-aminopropyl)trimethoxysilane were combined at room temperature and were subjected directly to the phase separation test after stirring for 30 minutes at room temperature.

Comparative Example 2

COB 2

The procedure was analogous to example 4, with the difference that the polyvinyl alcohol solution and N-(2-aminoethyl)(3-aminopropyl)trimethoxysilane were subjected directly to the phase separation test after stirring for 30 minutes at room temperature.

Phase Separation Test:

The aqueous solutions of the silane-modified additives of examples 1 to 4 and of comparative examples 1 and 2 were diluted to 10% by weight with water and in each case introduced into cylinders (diameter 2 cm and height 30 cm). After allowing to stand for 24 hours under standard conditions according to DIN 50014, the homogeneity (one-phase or two-phase) of the respective aqueous mixture was assessed.

TABLE 1

Storage stability of the silane-modified additives:

| | Proportion by weight of the respective silane, based on polyvinyl alcohol (%) | Homogeneity |
| --- | --- | --- |
| Ex. 1 | 11 | one-phase |
| Ex. 2 | 15 | one-phase |
| Ex. 3 | 20 | one-phase |
| Ex. 4 | 30 | one-phase |
| COB 1 | 20 | two-phase |
| COB 2 | 30 | two-phase |

From the results recorded in table 1, it is evident that the silane-modified additives according to the invention (ex. 1 to 4) are present as a one-phase and homogeneous solution even after prolonged storage and are therefore storage-stable, in contrast to the corresponding mixtures of the comparative examples (COB 1 and 2).

Preparation of Silane-Modified Additives in the Form of Powders:

The respective aqueous silane-modified additive was sprayed by means of a two-fluid nozzle. Compressed air (3 bar) served as an atomizing medium. The drying was effected by the cocurrent method with air heated to 125° C. 3-15% by weight of commercially available antiblocking agent were added to the dry powder obtained.

Powder P1:
    Aqueous silane-modified additive from example 1.
Powder P2:
    Aqueous silane-modified additive from example 2.
Powder P3:
    Aqueous silane-modified additive from example 3.
Powder P4:
    Aqueous silane-modified additive from example 4.
Comparative Powder CP5:
    Instead of an aqueous silane-modified additive, an aqueous polyvinyl alcohol solution (solids content=20% by weight) having a degree of hydrolysis of 88 mol % and a Höppler viscosity of 4 mPas was used.
Comparative Powder CP6:
    Drying of the aqueous mixture from comparative example COB 1 was not possible since a two-phase mixture was present and homogeneous mixing was not achieved.
Comparative Powder CP7:
    Drying of the aqueous mixture from comparative example COB 2 was not possible since a two-phase mixture was present and homogeneous mixing was not achieved.
Preparation of Silane-Modified Polymer Compositions with the Use of Water-Insoluble Polymers in the Form of Aqueous Dispersions:
    The respective aqueous silane-modified additive was mixed with a polyvinyl alcohol-stabilized ethylene-vinyl acetate copolymer dispersed in water and, if appropriate, with a polyvinyl alcohol mixture having a degree of hydrolysis of 88 mol % and a Höppler viscosity of from 4 to 13 mPas and then dried analogously to the preparation of the silane-modified additives in the form of powders, with the result that the respective silane-modified polymer composition was obtained in the form of its powder redispersible in water.
Powder P8:
    60% by weight of ethylene-vinyl acetate copolymer dispersion, 36% by weight of the aqueous silane-modified additive from example 2 and 4% by weight of polyvinyl alcohol, the data in % by weight being based on the total weight of the dry mixture.
Powder P9:
    73% by weight of ethylene-vinyl acetate copolymer dispersion, 23% by weight of the aqueous silane-modified additive from example 2 and 4% by weight of polyvinyl alcohol, the data in % by weight being based on the total weight of the dry mixture.
Powder P10:
    81% by weight of ethylene-vinyl acetate copolymer dispersion, 15% by weight of the aqueous silane-modified additive from example 2 and 4% by weight of polyvinyl alcohol, the data in % by weight being based on the total weight of the dry mixture.
Comparative Powder CP11:
    60% by weight of ethylene-vinyl acetate copolymer dispersion, 36% by weight of N-(2-aminoethyl)(3-amino-propyl)trimethoxysilane and 4% by weight of polyvinyl alcohol, the data in % by weight being based on the total weight of the dry mixture.
Preparation of Silane-Modified Polymer Compositions with the Use of Water-Insoluble Polymers in the Form of Powders Redispersible in Water:
Powder P12:
    Powder P1 and Vinnapas RE 5028 N were mixed in the weight ratio 1:1, based on the weight of the two components. Vinnapas RE 5028 N is a polyvinyl alcohol-stabilized dispersion powder of a vinyl acetate-ethylene copolymer from Wacker Polymer Systems.
Powder P13:
    Powder P2 and Vinnapas RE 5028 N were mixed in the ratio 1:1, based on the weight of the two components.
Powder P14:
    Powder P3 and Vinnapas RE 5028 N were mixed in the ratio 1:1, based on the weight of the two components.
Powder CP15:
    Vinnapas RE 5028 N
Dispersion 1:
    Vinnapas RE 5028 N was dispersed in the aqueous solution from example 1 in the weight ratio 1:1, the weight ratio being based on the dry mass of the two components.
Dispersion 2:
    Vinnapas RE 5028 N was dispersed in the aqueous solution from example 2 in the weight ratio 1:1, the weight ratio being based on the dry mass of the two components.
Dispersion 3:
    Vinnapas RE 5028 N was dispersed in the aqueous solution from example 3 in the weight ratio 1:1, the weight ratio being based on the dry mass of the two components.
Testing:
    Powders P1 to P4 or comparative powders CP11 and CP5 were investigated with regard to their powder properties and with regard to their processing properties and possibility of use in a cementitious tile adhesive.
Determination of the Resistance to Blocking BR:
    For determining the resistance to blocking, the respective powder was introduced into an iron tube having a screw cap and then loaded with a metal stamp. Storage was effected under load in a drying oven for 16 hours at 50° C. After cooling to room temperature, the powder was removed from the tube and the stability to blocking was determined qualitatively by crushing the respective powder. The stability to blocking was classified as follows:
1=very good stability to blocking
2=good stability to blocking
3=satisfactory stability to blocking
4=not stable to blocking, powder no longer flowable after crushing.
Determination of the Settling Behavior SB:
    The settling behavior of the redispersion serves as a measure of the redispersibility of the powder. The redispersions were produced 50% strength in water by the action of strong shear forces.
    The settling behavior was then determined on dilute redispersions (0.5% solids content), and for this purpose 100 ml of this dispersion were introduced into a graduated tube and the settling height of solid was measured. The data are in mm settling after 24 hours. Values greater than 7 indicate insufficient redispersion of the powder.
Determination of the Adhesive Strengths as in Modified, Cementitious Tile Adhesives:
    The adhesive strength was tested on the basis of the following formulation:

| | |
|---|---|
| Quartz sand | 514 parts by weight |
| Cement (Portland/high-alumina cement mix) | 420 parts by weight |
| Cellulose ether | 4 parts by weight |

Silane-modified polymer composition or silane-modified additive 60 parts by weight the data in parts by weight being based on the dry masses of the individual components of the formulation.
    The dry mortar was stirred with from 22 to 24 parts by weight of water, based on 100 parts by weight of dry mix.

The adhesive strengths with fine stoneware tiles were determined according to EN 1348 (tile 1: water absorption≤0.2% by weight; tile 2: water absorption≤0.05% by weight) after 7 days under standard climatic conditions and after wet storage for 21 days.

The results of the testing of the resistance to blocking BR of the powders, of the settling behavior SB of the redispersions and of the adhesive strengths AS of the tile adhesives are summarized in table 2.

The data in table 2 show that the powder properties, such as, for example, the resistance to blocking BR or the settling behavior SB, of the silane-modified additives according to the invention (P1 to P4) are mostly better than in the case of the corresponding comparative powder CP5 which is not modified with silanes. The powder properties of the silane-modified polymer compositions P8, P9 and P10 are considerably improved compared with the powder CP11 not prepared according to the invention.

In addition, high adhesive strengths AS are achieved on use of the silane-modified additives according to the invention or silane-modified polymer compositions according to the invention (P1 to P4 and P8 to P10) in mortars for the adhesive bonding of tiles. With a corresponding mortar containing the silane-modified powder CP11 not prepared according to the invention, on the other hand, considerably lower adhesive strength values were achieved, which correspond more to the adhesive strength values of mortars which contain no silane-modified powders (CP5).

Particularly in the case of the adhesive bonding of fine stoneware tiles having a low water absorption, such as, for example, tile 2, surprisingly high adhesive strengths are obtained with the powders P1 to P4 according to the invention compared with powders CP11 and CP5.

TABLE 2

Testing of silane-modified polymer compositions:

| | | | AS [N/mm²] | |
| --- | --- | --- | --- | --- |
| | BR | SB | Tile 1 | Tile 2 |
| Powder P1 | 1 | <0.5 | 2.04 | 0.58 |
| Powder P2 | 2 | <0.5 | 1.99 | 0.65 |
| Powder P3 | 1 | <0.5 | 1.75 | 0.70 |
| Powder P4 | 2 | <0.5 | 1.44 | 0.63 |
| Powder P8 | 2 | 0.2 | 1.24 | 0.76 |
| Powder P9 | 1 | 0.2 | 1.36 | 0.67 |
| Powder P10 | 1 | 1.8 | 1.54 | 0.72 |
| Powder CP5 | 2 | <0.5 | 0.76 | 0.08 |
| Powder CP11 | 4 | >7 | 0.62 | 0.18 |

It is evident from tables 2 and 3 that mortars having very high adhesive strengths are obtained with the silane-modified additives or silane-modified polymer compositions according to the invention, in particular independently of the method of their preparation (powders P1 to P4 or powders P8 to P10 or powders P12 to P14 or dispersions 1 to 3).

In addition, the content of the silane-modified additives or of the organosilicon compounds in the silane-modified polymer compositions can be arbitrarily set (powders P8 to P10 or powders P12 to P14 or dispersions 1 to 3). Thus, the silane-modified additives according to the invention provide very versatile and flexible access to silane-modified polymer compositions.

TABLE 3

Testing of silane-modified polymer compositions:

| | AS [N/mm²] | |
| --- | --- | --- |
| | Tile 1 | Tile 2 |
| Powder P12 | 1.83 | 0.60 |
| Powder P13 | 1.99 | 0.52 |
| Powder P14 | 1.92 | 0.62 |
| Powder CP15 | 1.12 | 0.30 |
| Dispersion 1 | 1.96 | 0.66 |
| Dispersion 2 | 1.79 | 0.49 |
| Dispersion 3 | 1.84 | 0.51 |

The invention claimed is:

1. A silane-modified additive obtained by condensation reaction of one or more silanes according to formula (1)

$$(RO)_{3-n}R^1{}_nSi(R^2X) \tag{1}$$

in an aqueous solvent with mixing with one or more water-soluble polymers to form an aqueous mixture, wherein the pH of the aqueous mixture during the condensation reaction is in a range from 2 to 11, and optionally drying the aqueous mixture thus obtained;
wherein
  R is an alkyl, aryl or alkoxyalkyl radical having 1 to 10 carbon atoms, a substituted alkyl, aryl or alkoxyalkyl radical having 1 or 10 carbon atoms, or hydrogen,
  $R^1$ is a hydrocarbon radical having 1 to 12 carbon atoms, a substituted hydrocarbon radical having 1 to 12 carbon atoms, or hydrogen,
  $R^2$ is an alkylene radical having 1 to 20 carbon atoms, a substituted alkylene radical having 1 to 20 carbon atoms, an alkylene radical having 1 to 20 carbon atoms in which non-neighboring methylene units are replaced by groups —O—, or a substituted alkylene radical having 1 to 20 carbon atoms in which non-neighboring methylene units are replaced by groups —O—, and
  X is bonded via a covalent bond to $R^2$ and is an amino radical $NHR^3$,
  $R^3$ is hydrogen, an alkyl, aryl or aminoalkyl radical having 1 to 10 carbon atoms, or a substituted alkyl, aryl or aminoalkyl radical having 1 to 10 carbon atoms, and
  n is 0, 1, 2 or 3; and
  the content of the one or more water-soluble polymers is from 60 to 97% by weight and the content of the one or more silanes is from 3 to 40% by weight, based in each case on the dry mass of the silane-modified additive,
wherein the condensation reaction is carried out at a temperature from 40 to 100° C.

2. The silane-modified additive as claimed in claim 1, wherein the silane-modified additive contains from 70 to 85% by weight of the one or more water-soluble polymers, based on the dry mass of the silane-modified additive.

3. The silane-modified additive as claimed in claim 1, wherein the one or more silanes are selected from the group consisting of (3-aminopropyl)triethoxysilane, (3-aminopropyl)trimethoxysilane, N-(2-aminoethyl)(3-aminopropyl)-triethoxysilane, N-(2-aminoethyl)(3-aminopropyl)-trimethoxysilane, N-(2-aminoethyl)(3-aminopropyl)-methyldimethoxysilane, and N-cyclohexylaminomethylmethyldiethoxysilane.

4. The silane-modified additive as claimed in claim 1, wherein the one or more water-soluble polymers are selected from the group consisting of polyvinyl alcohols; polyvinyl acetals; polyvinylpyrrolidones; polysaccharides; and proteins.

5. The silane-modified additive as claimed in claim 4, wherein the one or more water-soluble polymers are selected from the group consisting of starches (amylose and amylopectin), celluloses and the carboxymethyl, methyl, hydroxyethyl and hydroxypropyl derivatives thereof, dextrins and cyclodextrins.

6. The silane-modified additive as claimed in claim 4, wherein the one or more water-soluble polymers are selected from the group consisting of casein or caseinate, soybean protein and gelatin.

7. The silane-modified additive as claimed in claim 4, wherein the one or more water-soluble polymers are selected from the group consisting of poly(meth)acrylic acid, copolymers of (meth)acrylates with carboxy-functional comonomer units, poly(meth)acrylamide, polyvinylsulfonic acids and copolymers thereof; melamine formaldehyde sulfonates, naphthalene formaldehyde sulfonates, cresol formaldehyde sulfonates, styrene-maleic acid copolymers and vinyl ether-maleic acid copolymers.

8. The silane-modified additive as claimed in claim 1, wherein the content of the one or more silanes according to formula (1) is from 10 to 35% by weight, based on the dry mass of the silane-modified additive.

9. A process for preparing a silane-modified polymer composition, comprising mixing one or more silane-modified additives according to claim 1 with one or more water-insoluble polymers.

10. An adhesion promoter, water repellant or drying aid for drying aqueous dispersions of polymers, comprising the silane-modified additive as claimed in claim 1.

11. A composition selected from the group consisting of tile adhesives, composite thermal insulation adhesives, renders, filling compounds, leveling compounds, seal coat slurries, joint mortars, pneumatically applied mortars, air-placed concrete and paints, comprising the silane-modified additive as claimed in claim 1.

12. A tile adhesive for tiles having a water absorption of ≤0.2% by weight, wherein the tile adhesive comprises the silane-modified additive as claimed in claim 1.

13. The silane-modified additive as claimed in claim 1, wherein the pH is in a range from 8 to 9.

14. The silane-modified additive as claimed in claim 1, wherein the aqueous solvent consists of water or a mixture consisting of water and methanol or ethanol.

15. The silane-modified additive as claimed in claim 1 provided in an aqueous solution, aqueous emulsion, or aqueous dispersion having a solids content ≥15% by weight.

16. A process for preparing a silane-modified additive, comprising a step of condensation reacting one or more silanes according to formula (1)

$$(RO)_{3-n}R^1_n Si(R^2 X) \qquad (1)$$

in an aqueous solvent with mixing with one or more water-soluble polymers to form an aqueous mixture, wherein the pH of the aqueous mixture during the condensation reaction is in a range from 2 to 11, and optionally drying the aqueous mixture thus obtained;

wherein
R is an alkyl, aryl or alkoxyalkyl radical having 1 to 10 carbon atoms, a substituted alkyl, aryl or alkoxyalkyl radical having 1 to 10 carbon atoms, or hydrogen, $R^1$ is a hydrocarbon radical having 1 to 12 carbon atoms, a substituted hydrocarbon radical having 1 to 12 carbon atoms, or hydrogen, $R^2$ is an alkylene radical having 1 to 20 carbon atoms, a substituted alkylene radical having 1 to 20 carbon atoms, an alkylene radical having 1 to 20 carbon atoms in which non-neighboring methylene units are replaced by groups —O—, or a substituted alkylene radical having 1 to 20 carbon atoms in which non-neighboring methylene units are replaced by groups —O—, and X is bonded via a covalent bond to $R^2$ and is an amino radical $NHR^3$, $R^3$ is hydrogen, an alkyl, aryl or aminoalkyl radical having 1 to 10 carbon atoms, or a substituted alkyl, aryl or aminoalkyl radical having 1 to 10 carbon atoms, and n is 0, 1, 2 or 3, and the content of the one or more water-soluble polymers is from 60 to 97% by weight and the content of the one or more silanes is from 3 to 40% by weight, based in each case on the dry mass of the silane-modified additives, wherein the step of condensation reacting is carried out at a temperature from 40 to 100° C.

17. The process as claimed in claim 16, wherein the pH is in a range from 8 to 9.

18. The process as claimed in claim 16 wherein the aqueous solvent consists of water or a mixture consisting of water and methanol or ethanol.

19. The process as claimed in claim 16 further comprising providing the silane-modified additive in an aqueous solution, aqueous emulsion, or aqueous dispersion having a solids content ≥15% by weight.

* * * * *